US005369465A

United States Patent [19]

Kuwahara

[11] Patent Number: 5,369,465

[45] Date of Patent: Nov. 29, 1994

[54] IMAGE FORMING APPARATUS WITH MAGNIFICATION VARYING FUNCTION

[75] Inventor: Tesshu Kuwahara, Kawaguchi, Japan

[73] Assignee: Kabushiki Kaisha Toshiba, Kanagawa, Japan

[21] Appl. No.: 34,312

[22] Filed: Mar. 19, 1993

[30] Foreign Application Priority Data

Jul. 10, 1992 [JP] Japan .................................. 4-183660

[51] Int. Cl.[5] .................................... G03B 27/34

[52] U.S. Cl. .................................... 355/57; 355/55; 355/60; 355/243

[58] Field of Search .................... 355/55, 57, 60, 243

[56] References Cited

U.S. PATENT DOCUMENTS 4,332,877 6/1982 Tabata .................................. 430/103
4,514,080 4/1985 Matsuzawa et al. .............. 355/14 C
4,561,758 12/1985 Nawata et al. ........................ 355/8
4,845,526 7/1989 Ito .................................. 355/243 X

*Primary Examiner*—Michael L. Gellner
*Assistant Examiner*—Daniel P. Malley
*Attorney, Agent, or Firm*—Limbach & Limbach

[57] ABSTRACT

There is provided an image forming apparatus having a magnification varying function for adjusting a lateral magnification and focus by varying the positions of a lens and a mirror of an exposure optical system for forming an image of an original on a photosensitive drum. The apparatus comprises number keys and a print key for inputting data for setting an image formation magnification, data on the lateral magnification, and data on focus adjustment, a pulse motor for moving the lens and the mirror on the basis of the data input by the number keys and print key, an interrupt key for inputting position data on the lens and the mirror when a minimum reduction magnification and a maximum enlargement magnification are input by the number keys and print key, the lens and the mirror are moved by the pulse motor, and the lateral magnification and the focus are adjusted, a memory unit for storing the position data input by the interrupt key, and a control unit for calculating a coefficient for correcting a difference in optical path length due to a variation in lens characteristics, on the basis of the position data stored in the memory unit, and calculating the positions of the lens and the mirror by substituting the coefficient when the image formation magnification is input by the ten keys.

2 Claims, 4 Drawing Sheets

IMAGE FORMING APPARATUS WITH MAGNIFICATION VARYING FUNCTION

BACKGROUND OF THE INVENTION

1. Field of the Invention

The present invention relates to a zoom-type image forming apparatus capable of forming a magnification-varied image.

2. Description of the Related Art

In general, this type of image forming apparatus, e.g. a zoom copying machine, has an exposure optical system comprising a lens for forming an image of an original on an image carrying body, a mirror, etc.

The lateral magnification (i.e. a magnification in a direction perpendicular to the direction in which a paper sheet is moved) is varied by moving the lens and varying the length of an optical path. The focus is adjusted by moving the mirror.

In the equal-size copy mode (magnification=100%), the following equation is generally given:

$$a:(c-a)=2f:2f$$

where a=the distance between face A of an original and lens L, c=the distance between face A of an original and face B of a photosensitive drum functioning as an image carrying body, and f=the focal distance of a lens.

In the 50% magnification copy mode, the following is given:

$$a:(c-a)=3f:1.5f$$

In the 200% magnification copy mode, the following is given:

$$a:(c-a)=1.5f:3f$$

These equations are established in the ideal state in which a variation of lens need not be corrected.

The distances a and c (including correction values) are expressed by $$a=2f+K1\ (1/m-1)(1+\alpha)$$

$$c=4f+K2\ (m+1/m-2)(1+\alpha)$$

K1, K2=the constants given by the lens, m=magnification (0.5–2.0), and $\alpha$=the coefficient for correcting a variation of lenses.

In a conventional image forming apparatus of this type, the values of $\alpha$ are stored in the form of codes representing lens types selected from among predetermined 21 lens types.

When the lateral magnification of copy and focus are adjusted, the adjustment mode is set in the apparatus. The adjustment of 100% lateral magnification (lens position adjustment) and the focus adjustment (position adjustment of a third carriage having the mirror) are performed, while the copied image is viewed. In the zoom mode, the optimal lens position at which, e.g. 50% or 200% lateral magnification adjustment and focus adjustment are achieved, is found, and the pulse motor drive data for shifting the lens to the optical lens position is input and memorized. By accessing the drive data, the lens and mirror are driven in an interlocking manner.

In this conventional method, however, one must perform actual copying operations several times and check the copied images, thereby finding the optimal drive data. In addition, since the lens and mirror are driven in an interlocking manner, there may occur an undesirable situation in which the focus is not adjusted although the lateral magnification is adjusted, or the lateral magnification is not adjusted although the focus is adjusted, or both the lateral magnification and focus are not adjusted.

Moreover, in the conventional method, a mechanical error cannot be corrected.

As has been stated above, in the conventional zoom-type image forming apparatus, it is troublesome to obtain optimal drive data for adjusting the lateral magnification and focus, and the obtained data is not satisfactory.

SUMMARY OF THE INVENTION

The present invention has been devised in consideration of the above circumstances, and its object is to provide a zoom-type image forming apparatus capable of easily adjusting the lateral magnification and focus in the zoom mode, and forming an image with high zoom precision and high focus precision.

According to an aspect of the invention, there is provided an image forming apparatus having a magnification varying function for adjusting positions of optical devices comprising:

means for inputting data for setting an image formation magnification, data for adjusting the lateral magnification, and data for adjusting focus;

means for moving the optical devices on the basis of the data input by the input means;

means for inputting position data on the optical devices when a first magnification and a second magnification are input by the input means, the optical devices are moved by the moving means, and the lateral magnification and the focus are adjusted;

memory means for storing the position data input by the position data inputting means; and means for calculating a coefficient for correcting a difference in optical path length due to a variation in characteristics, of the optical devices on the basis of the position data stored in the memory means, and calculating the positions of the optical devices by substituting the coefficient when the image formation magnification is input by the input means.

According to another aspect of the invention, there is provided an image forming apparatus having a magnification varying function for adjusting positions of a lens and a mirror comprising:

means for inputting data for setting an image formation magnification, data for adjusting the lateral magnification, and data for adjusting focus;

means for moving the lens on the basis of the data input by the input means;

means for moving the mirror on the basis of the data input by the input means;

means for inputting position data on the lens and the mirror when a minimum reduction magnification and a maximum enlargement magnification are input by the input means, the lens and the mirror are moved by the moving means, and the lateral magnification and the focus are adjusted;

memory means for storing the position data input by the position data inputting means;

means for calculating a coefficient for correcting a difference in optical path length due to a variation in characteristics of the lens, on the basis of the position data stored in the memory means, and calculating the positions of the lens and the mirror by substituting the coefficient when the image formation magnification is input by the input means; and means for controlling the lens moving means to move the lens to the position calculated by the calculating means and, controlling the mirror moving means to move the mirror to the position calculated by the calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will now be described with reference to the accompanying drawings.

Figure 1:
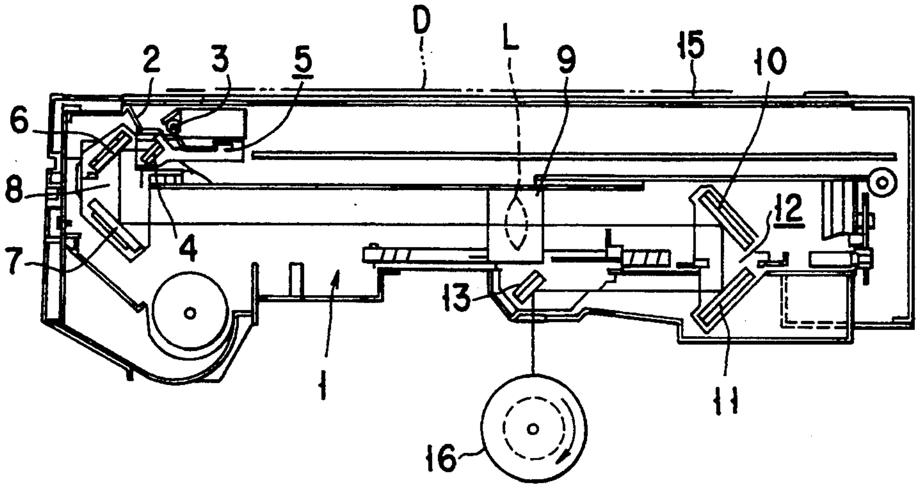
FIG. 1 is a front view showing an exposure optical system of an image forming apparatus according to an embodiment of the invention.

FIG. 1 shows an exposure optical system 1 of an image forming apparatus according to the embodiment. The exposure optical system 1 comprises an exposure lamp 3 having a rear portion surrounded by a reflector 2, and a first carriage 5 having a first mirror 4.

The exposure optical system 1 further comprises a second carriage 8 having second and third mirrors 6 and 7, and a lens unit 9 having a lens L.

The exposure optical system 1 further comprises a third carriage 12 having fourth and fifth mirrors 10 and 11, and a sixth mirror 13.

The first carriage 5 and second carriage 8 are moved at a constant speed from one end to the other under the lower surface of an original document table 15. Thereby, an original D placed on the table 15 is scanned and an electrostatic latent image of the original D is formed on a photosensitive drum 16 functioning as an image carrying body.

Figure 2:
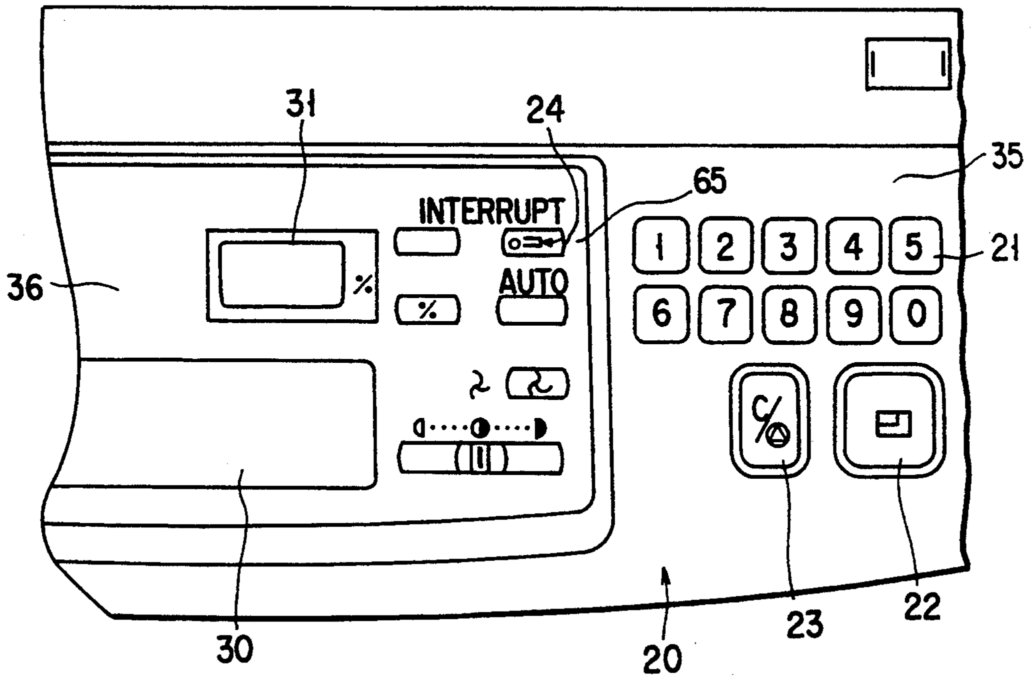
FIG. 2 is a plan view showing a part of a scan panel of the image forming apparatus according to the embodiment.

FIG. 2 shows a scan panel 20. The scan panel 20 comprises number keys 21, a print key 22, a clear/stop key 23 and an interrupt key 24, which constitute input means 35 and position data input means 65. The scan panel 20 further comprises display units 30 and 31 for displaying various information, which constitute display means 36.

Figure 3:
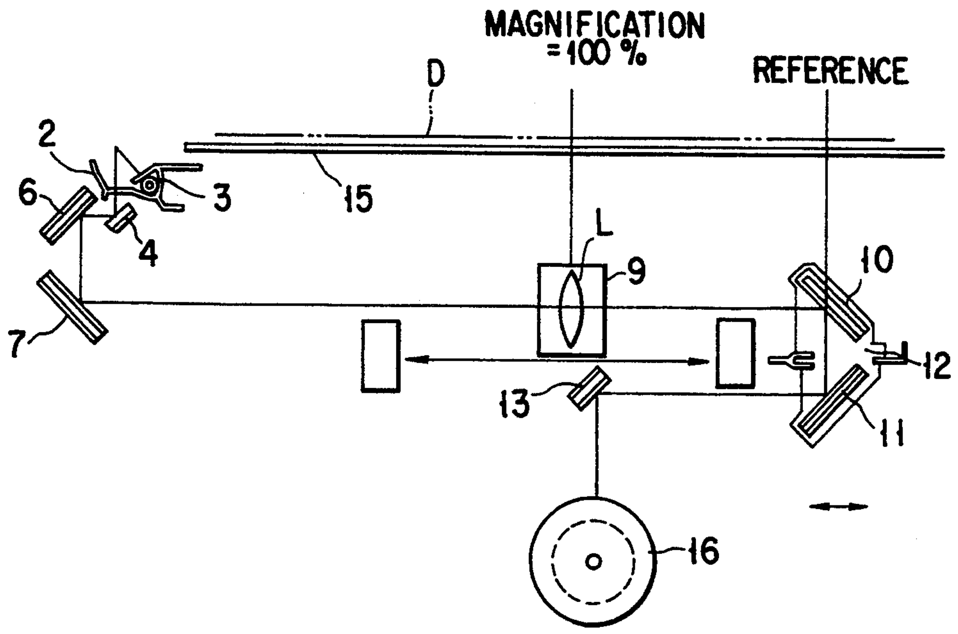
FIG. 3 is a view for explaining the lateral magnification and focus of the exposure optical system shown in FIG. 1.

FIG. 3 is a view for explaining the lateral magnification and focus. When the lens unit 9 is moved from the 100% magnification position to the original document surface side along the optical path (i.e. to the left in FIG. 3), the copy image is enlarged. When the lens unit 9 is moved from the 100% magnification position to the photosensitive drum side along the optical path (i.e. to the right in FIG. 3), the copy image is reduced.

Figure 4:
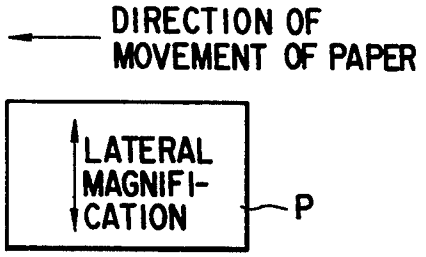
FIG. 4 is a view showing the relationship between the lateral magnification and the direction of movement of paper sheet in the exposure optical system shown in FIG. 1.

As is illustrated in FIG. 4, the lateral magnification is a magnification in a direction perpendicular to the direction of movement of paper P, i.e. a magnification in the axial direction of the photosensitive drum 16. Like the length magnification, the lateral magnification can be varied in a non-stepwise manner in units of 1% between 50% and 200%.

The focus adjustment is performed by slightly moving the third carriage 12 having the fourth and fifth mirrors 10 and 11 in a horizontal direction (in FIG. 3).

Figure 5:
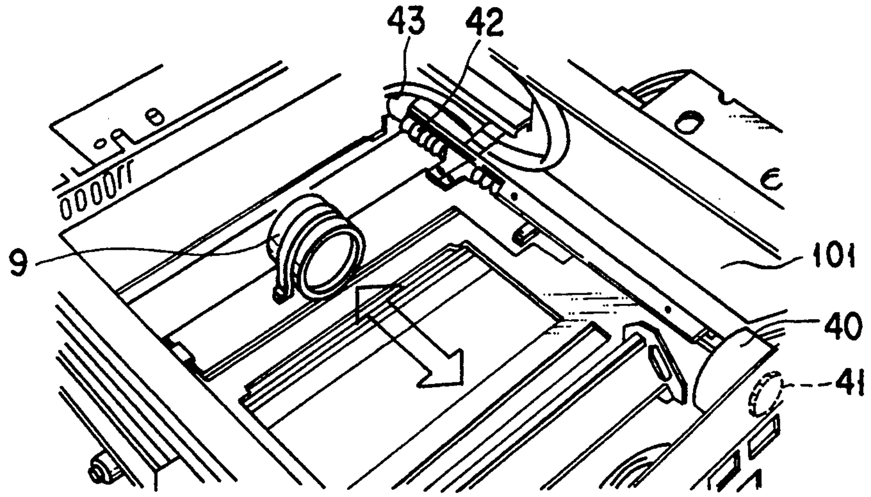
FIG. 5 is a perspective view showing a lens unit drive system in the exposure optical system shown in FIG. 1.

FIG. 5 shows a lens unit drive system 101 as a driving means for driving the lens unit 9. In this drive system 101, a driving force of a lens drive pulse motor 40 is transmitted to a screw shaft 42 via a gear mechanism 41 functioning as deceleration mechanism, thereby reciprocally moving the lens unit 9 in the direction of the arrow in FIG. 5.

Numeral 43 denotes a lens switch for detecting the lens position.

Figure 6:
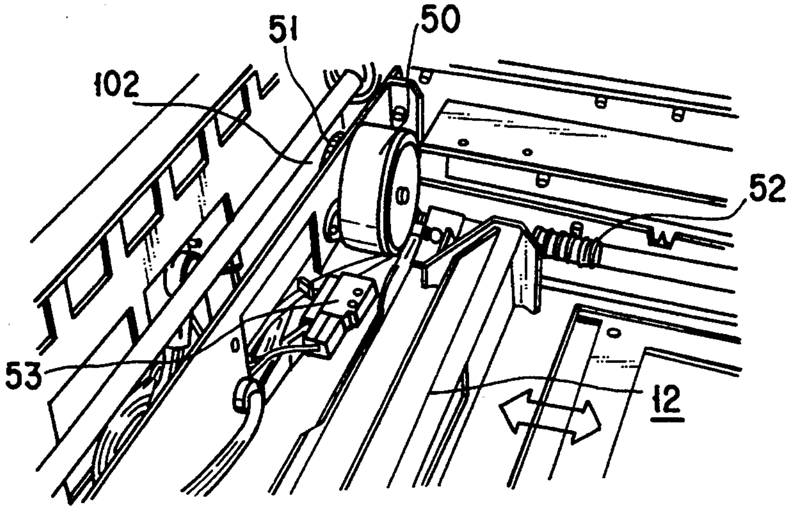
FIG. 6 is a perspective view showing a third carriage drive system in the exposure optical system shown in FIG. 1.

FIG. 6 shows a third carriage driving system 102 as a driving means for driving the third carriage (mirror unit) 12. In this drive system 102, a driving force of a mirror drive pulse motor 50 is transmitted to a screw shaft 52 via a gear mechanism 51 functioning as deceleration mechanism, thereby reciprocally moving the third carriage (mirror unit) 12 in the direction of the arrow in FIG. 6.

Numeral 53 denotes a mirror switch for detecting the mirror position.

Figure 7:
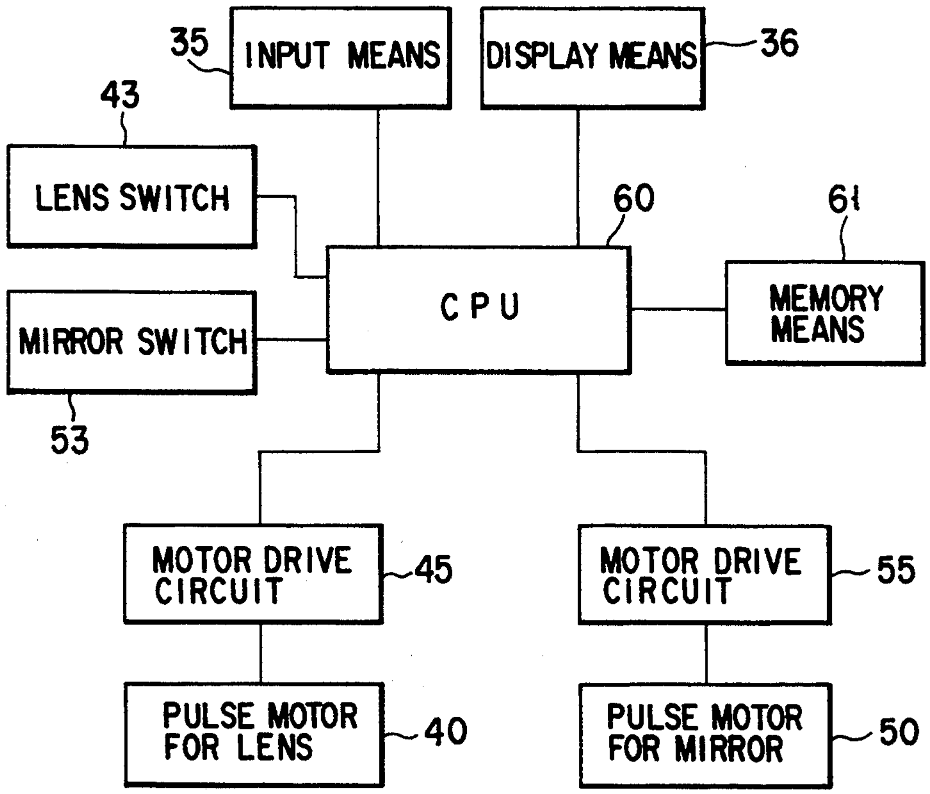
FIG. 7 is a block diagram showing a control system of the image forming system according to the embodiment.
Figure 8:
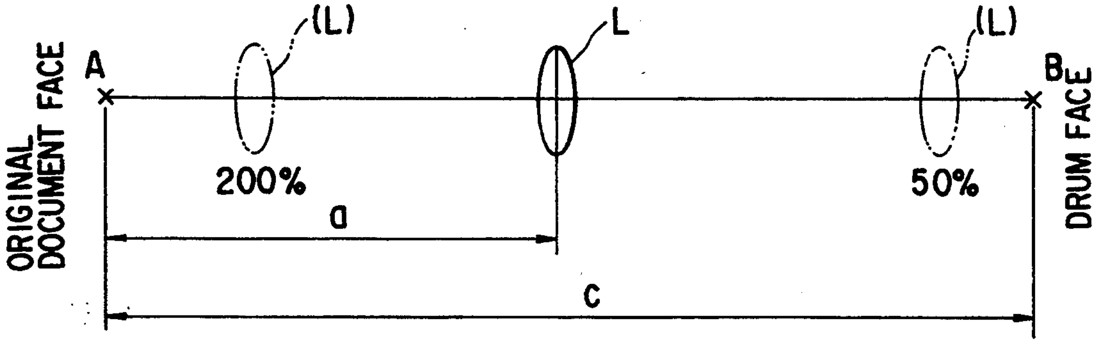
FIG. 8 is view illustrating the relationship between the copy magnification and optical path length in the exposure optical system shown in FIG. 1.

FIG. 7 shows a control system for controlling the movement amount of the lens unit 9 and third carriage (mirror unit) 12 in the lateral magnification adjustment mode and focus adjustment mode.

A CPU 60 functioning as control means is connected to the input means 35, display means 36, lens switch 43 and mirror switch 53. The CPU 60 is further connected to the lens drive pulse motor 40 via a motor drive circuit 45 and to the mirror drive pulse motor 50 via a motor drive circuit 55.

In addition, the CPU 60 is connected to various devices of image forming process means (not shown) for forming a developer image on the photosensitive drum 16 and transferring the image onto paper P, and memory means 61 for storing data described later.

In the image forming apparatus having the exposure optical system 1, suppose that the lens meets the conditions of equations (1) and (2) with respect to the relationship between the optical path length and the magnification and focal point:

$$a=\{2f+K1\ (1/m-1)(1+\alpha)\}/d \quad (1)$$

$$c=\{4f+K2\ (m+1/m-2)(1+\beta)\}/e \quad (2)$$

Regarding this lens, the copy magnification (lateral magnification) is determined by the value a, i.e. the distance between the center of lens L and the original document face A.

The focal point is determined by the value c, i.e. the optical path length between the original document face A and the drum face B.

The value a is the distance between the center of lens L and the original document face A, and the value c is the optical path length between the original document face A and the drum face B which carries an image. K1 and K2 are constants of the lens, and m is the magnification. The value f is the focal distance, and $\alpha$ and $\beta$ are coefficients for correction of optical path length. The value d is the gear ratio of the lens drive system, and e is the gear ratio of the mirror drive system.

In this exposure optical system, the copy magnification is varied by moving the lens unit 9 by means of the pulse motor 40 by a distance corresponding to a necessary number of pulses, so that the optical path length between the center of lens L and the original document face A becomes equal to a.

The focus is adjusted by moving the third carriage 12 by means of the pulse motor 50 by a distance corresponding to a necessary number of pulses, so that the optical path length between the original document face A and the drum face B becomes equal to c.

In order to calculate the optimal lens position and mirror position from equations (1) and (2) by inputting the magnification m as a parameter, it is necessary to find the above-mentioned constants.

Thus, in the present invention, the optimal distances at the minimum magnification (=50%) and the maximum magnification (=200%) are obtained by adjustment on the basis of actual copying operations.

Then, by substituting the values a in this case into equation (1), two formulas are obtained to calculate K1 and $\alpha$. Similarly, the values c at the time of 50% magnification and 200% magnification into equation (2), the values K2 and $\beta$ are obtained. Thereby, formulas (1) and (2) in which the magnification m is employed as a parameter are obtained.

Thus, the magnification m is substituted, when necessary, in equations (1) and (2) in the CPU 60, thereby determining the zoom positions.

In order to input the number of steps for obtaining the values a corresponding to the 100% copy magnification, 50% copy magnification and 200% copy magnification and the number of steps for obtaining optical focal points in these cases, the following specific procedures are carried out:

1) The power is turned on with the value "05" input by number keys 21, and thus the test mode is initiated.
2) The value "50" is input by number keys 21 and the print key 22 is depressed, and thus the adjustment value "08" of lateral magnification is displayed, for example, on the display unit 30.
3) When the lateral magnification (100%) is varied, for example, the value "10" is input by number keys 21 and the interrupt key 24 is depressed, and thus the input data is stored in the memory means 61 (see FIG. 7).
4) It is judged whether the lateral magnification is correct, by viewing copied images (if the lateral magnification is not correct, a value other than "10" is input).
5) The above operation is repeated in the range of values "0" and "16" until satisfactory result is obtained.
6) Similarly, the power is turned on with the value "05" input by number keys 21, and thus the test mode is initiated.
7) The value "51" is input by number keys 21 and the print key 22 is depressed, and thus the focus adjustment value (100%) is displayed, for example, on the display unit 30. For example, "08" is displayed.
8) When the focus (100%) is adjusted, for example, "15" is input by number keys 21, and then the interrupt key 24 is depressed. The input data is stored in the memory means 61 (see FIG. 7).
9) Similarly with the above, it is judged whether the focus has been adjusted by viewing copied images. If not, the input operation is repeated until satisfactory result is obtained.

In this manner, the lateral magnification and focus at the time of 100% magnification are adjusted in order to eliminate a mechanical error, the data relating to adjustment is stored in the memory means 61.

10) Then, in order to adjust the lateral magnification in the reduction mode (50%), the value "54" is input by number keys 21 and the print key 22 is depressed. Thereby, the value (e.g. "08") displayed, for example, on the display unit 30 is changed, and the copied image is viewed. The number of steps at which the lateral magnification has been adjusted is input and memorized. Specifically, the number of steps at which the value a corresponds to the 50% copy magnification is stored in the memory means 61.
11) In order to adjust the focus in the reduction mode (50%), the value "55" is input by number keys 21 and the print key 22 is depressed. Thereby, the value (e.g. "10") displayed, for example, on the display unit 30 is changed, and the copied image is viewed. The number of steps at which the focus has been adjusted is input and memorized. Specifically, the number of steps at which the focus has been adjusted is stored in the memory means 61.
12) Then, in order to adjust the lateral magnification in the enlargement mode (200%), the value "52" is input by number keys 21 and the print key 22 is depressed. Thereby, the value displayed, for example, on the display unit 30 is changed, and the copied image is viewed. The number of steps at which the lateral magnification has been adjusted is input and memorized. Specifically, the number of steps at which the value a corresponds to the 200% copy magnification is stored in the memory means 61.

13) In order to adjust the focus in the enlargement mode (200%), the value "53" is input by number keys 21 and the print key 22 is depressed. Thereby, the value displayed, for example, on the display unit 30 is changed, and the copied image is viewed. The number of steps at which the focus has been adjusted is input and memorized. Specifically, the number of steps at which the focus has been adjusted is stored in the memory means 61.

In this manner, on the basis of the optical path length correction coefficients $\alpha$ and $\beta$ of the lens L in the 100%, 50% and 200% magnification modes stored in the memory means 61, the zoom positions are determined by the calculation in the CPU 60.

Needless to say, the present invention is not limited to the above embodiment, and various modifications can be made without departing from the spirit of the invention.

As has been described above, according to the present invention, the lateral copy magnification of, e.g. 50% and the focus can be adjusted while the copied image is being viewed, and other zoom positions can automatically be obtained by subjecting to inverse operation the characteristic values obtained at that time. Thus, the optimal zoom position for the lateral magnification and focus can be found, and the image with high zoom precision and focus precision can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus comprising:
   a document table on which an original document is placed;
   image forming means for forming an image of the document on an image carrying body;
   magnification setting means for setting a variable magnification of the image to be formed on said image carrying body by means of said image forming means;
   magnification varying means, comprising a mirror and a lens, for varying the size of the image of the document at a magnification set by said magnification setting means;
   first input means for inputting data on a first distance between said document table and said magnification varying means;
   second input means for inputting data on a second distance between said document table and said image carrying body;
   first calculation means for calculating a value representing characteristics of said lens of said magnification varying means by referring to said first and second distances, in the case where said first distance input by said first input means is a distance between said document table and said lens at the time the image having the magnification set by said magnification setting means is obtained, and said second distance input by said second input means is a distance between said document table and said image carrying means at the time the image in focus is obtained;
   second calculation means for calculating, on the basis of the value representing the characteristics of the lens calculated by said first calculation means and the magnification input by said magnification setting means, a third distance between said document table and said lens corresponding to said magnification and a fourth distance between said document table and said image carrying body;
   lens moving means for moving said lens of said magnification varying means on the basis of said third distance calculated by said second calculation means; and
   mirror moving means for moving said mirror of said magnification varying means on the basis of said fourth distance calculated by said second calculation means.

2. A method for calculating a position of an optical system comprising a mirror and a lens in an image forming apparatus including a document table, comprising the steps of:
   finding a distance a1 between the document table and the lens at the time the size of an image output, when a first magnification m1 is set, equals the first magnification m1;
   finding a distance a2 between the document table and the lens at the time the size of an image output, when a second magnification m2 is set, equals the second magnification m2;
   calculating a first lens constant k1 and a first coefficient $\alpha$ by substituting the distance a1 between the document table and the lens at the time of the first magnification m1 and the distance a2 between the document table and the lens at the time of the second magnification m2 into equation 1:

$$a=\{2f+kl\ (1/(m-1))(1+\alpha)\} \quad (1)$$

where a=the distance between the table surface and the lens, m=a magnification, k1=the first lens constant, $\alpha$=the first coefficient, f=a focal distance, and d=a gear ratio;
   finding a distance c1 between the document table and the lens at the time the size of the image output, when the first magnification m1 is set, is in focus;
   finding a distance c2 between the document table and the lens at the time the size of the image output, when the second magnification m2 is set, is in focus;
   calculating a second lens constant k2 and a first coefficient $\beta$ by substituting the distance c1 between the document table and the drum at the time of the first magnification m1 and the distance c2 between the document table and the drum at the time of the second magnification m2 into equation (2):

$$c=\{4f+k2\ ((m+1))/(m-2))(1+\beta)\}/e \quad (2)$$

where c=the distance between the table surface and the drum, m=a magnification, k2=the second lens constant, $\beta$=the second coefficient, f=the focal distance, and e=a gear ratio;
   calculating, by substituting a magnification M in said equation (1), a distance A between the document table and the lens at this time;
   moving the lens to a position where the distance between the document table and the lens is A;
   calculating, by substituting the magnification M in said equation (2), a distance C between the document table and the drum at this time; and
   moving the mirror to a position where the distance between the document table and drum is C.

* * * * *